(No Model.)
J. H. DAVIS.
GALVANIC BATTERY.
No. 430,990. Patented June 24, 1890.
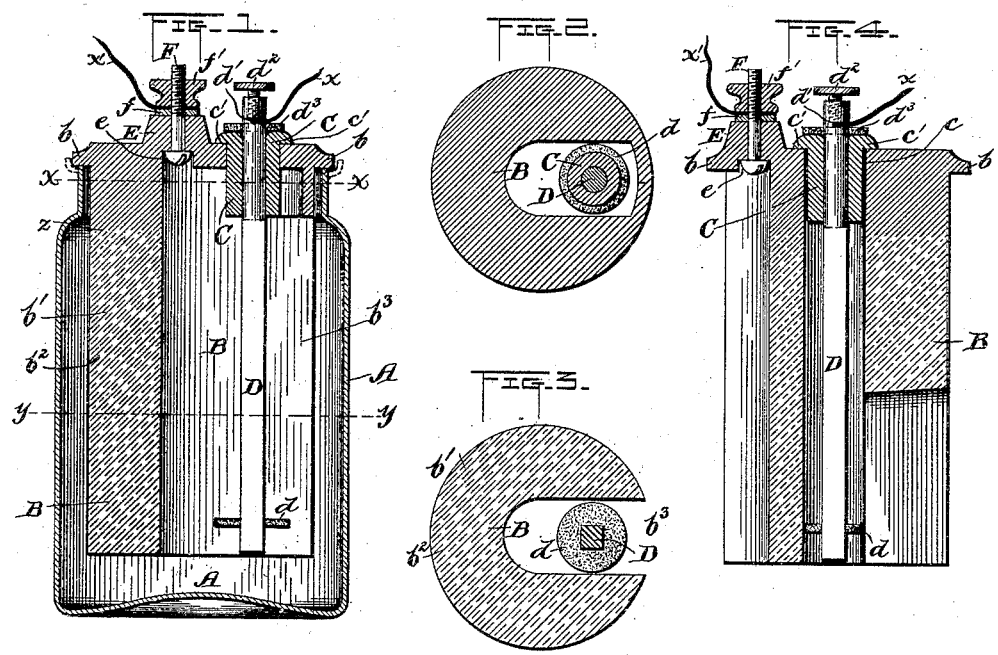
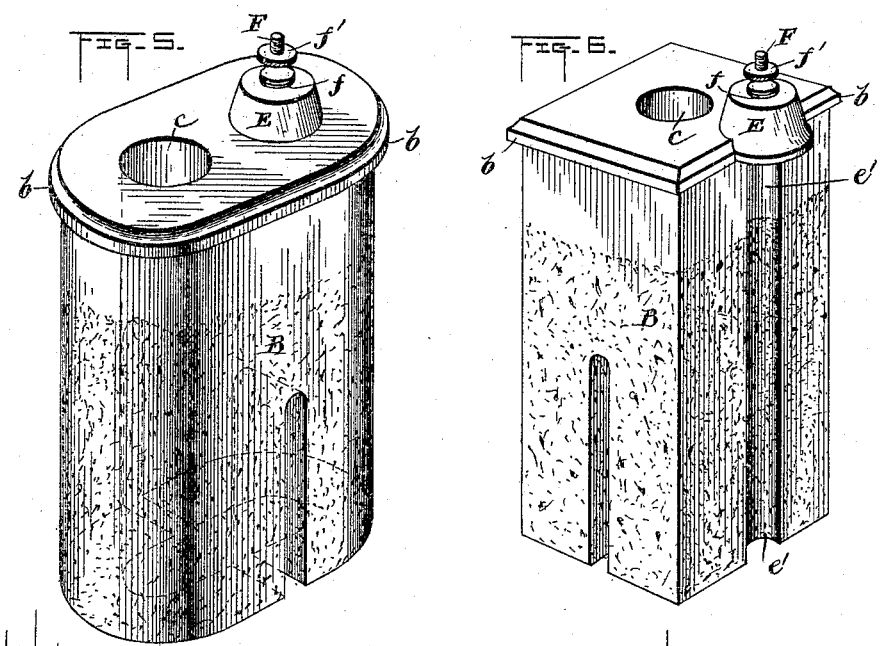
Witnesses:
Severance
W. J. Borden.
Inventor:
John H. Davis,
By L. Deane
his Attorney.

278
UNITED STATES PATENT OFFICE.

JOHN H. DAVIS, OF FINDLAY, OHIO, ASSIGNOR OF ONE-THIRD TO YEATMAN BICKHAM, OF SAME PLACE.

GALVANIC BATTERY.

SPECIFICATION forming part of Letters Patent No. 430,990, dated June 24, 1890.

Application filed February 14, 1890. Serial No. 340,456. (No model.)

*To all whom it may concern:*

Be it known that I, JOHN H. DAVIS, a citizen of the United States, residing at Findlay, in the county of Hancock and State of Ohio, have invented certain new and useful Improvements in Galvanic Batteries; and I do hereby declare the following to be a full, clear, and exact description of the invention, such as will enable others skilled in the art to which it appertains to make and use the same.

The invention relates to improvements in galvanic batteries of the class in which carbon is used as a negative electrode, (commonly called "carbon batteries,") the objects being to provide an effective battery of very simple construction, and to make the carbon electrode or cell in such manner that a certain portion thereof shall be solid and a second portion exceeding porous, thereby largely increasing the surface exposed to the solution into which the electrodes are inserted without increasing the bulk of the carbon cell.

With these objects in view the invention consists in the construction and novel combination of parts hereinafter described, illustrated in the accompanying drawings, and pointed out in the claims hereto appended.

In the drawings, in which similar letters of reference indicate corresponding parts, Figure 1 represents a central vertical section of a battery embodying the invention, the carbon being cylindrical. Fig. 2 represents a transverse section of the carbon on the line $xx$ of Fig. 1. Fig. 3 represents a similar section thereof on the line $yy$ of Fig. 1. Fig. 4 represents a central vertical section of a cylindrical carbon, which is a modification of that shown in Fig. 1. Fig. 5 represents a perspective view of an oval carbon. Fig. 6 represents a perspective view of a square carbon.

Referring to the drawings by letter, A designates the cup or jar of glass or other suitable material, which receives the solution used, and in which the electrodes depend. The said jar will preferably have a cross-section similar to that of the carbon within it, so that the two can be more easily and conveniently fitted together. The neck of the said jar may be straight and vertical, or it may have a circumferential shoulder or seat in its interior, as preferred.

B designates the hollow carbon electrode or cell, preferably cylindrical, open at its bottom, closed at its top, and provided around its upper end with a laterally-outstanding circumferential flange $b$, which rests upon the edge of the neck of the jar or upon the circumferential seat within said neck, so that the carbon depends and is supported within the jar, and the mouth of the jar is effectually closed thereby. The said flange is integral with the carbon, and the construction of the latter is as follows: The flange $b$ and the adjoining part of the body down to the proper point—say $z$, Fig. 1—are solid or non-porous, so that the flange can easily support the carbon within the jar without danger of breaking or crumbling. The portion $b'$ of the carbon below said point is, however, rendered exceedingly porous by foramina $b^2$, extending in various directions and which open on the sides and lower end of the carbon and within the same, thus increasing the surface exposed to the solution used much more than could be done by slots, perforations, corrugations, or the like, and rather decreasing than increasing the bulk of the carbon. The point $z$ is intended to be at about the level of the solution in the jar.

$b^3$ is a vertical slot open at bottom in one side of the wall of the carbon communicating with its interior.

$c$ is an opening, preferably central, in the top plate of the carbon, in which fits the shank or body of an insulating-thimble C, of porcelain, the outstanding circumferential flange $c'$ of which lies upon said top plate and effectually closes the opening $c$.

D is a bar of zinc forming the positive electrode, which passes through said thimble, down within the carbon, and has a rubber washer or gasket $d$ mounted on it near its lower end to prevent it coming in contact therewith. Near its upper end the zinc bar has a transverse perforation $d'$ to receive the end of the adjacent circuit-wire $x$, and a binding-screw $d^2$ of suitable form, but preferably a thumb-screw, engages a threaded opening in the end of the bar D to impinge on said wire and hold it in place. $d^3$ is a rubber washer surrounding the bar D between the thimble C and the head of the screw $d^2$, closing the joint of the wire and electrode and aiding in supporting the latter in place.

E is a boss standing from the top plate of the carbon at a suitable point, and having a recess $e$ within to receive and protect the head of the screw F, that engages upward in a vertical threaded perforation in said boss and in a metal washer $f$, set in the top thereof. Upon the shank of the screw above the boss engages the nut $f'$, which bears on the loop of a circuit-wire $x'$, bent around said shank, and holds the same between itself and the washer $f$, the screw, washer, and nut forming a binding-post for said wire.

In the modification shown in Fig. 4 the carbon has three equidistant vertical slots in its sides, and the boss rises from a lug standing out from the flange $b$.

In the modification shown in Fig. 5 the only difference is that the carbon is oval in cross-section instead of circular.

The first modification is the one preferred.

The carbon shown in Fig. 6 is square or rectangular in cross-section, and the vertical recess $e'$ at the rear affords space to reach the binding-post and fasten it in place.

In order to make a part of the carbon porous, as above described, the material is ground into powder of requisite fineness, (cold,) and then about ten per cent. of salt or any other suitable material is mixed into the powder and heated to about 175° Fahrenheit, and is then gaged out by weight and put in the mold and then a sufficient weight of the same material without salt is thrown on top of that which is in the mold, the cap put on, and then the pressure; and when the carbon is baked it comes out with the lower part porous and the top part solid. This is the way I prefer to accomplish the proposed end; but I do not purpose to restrict myself to any particular way or manner of making the carbon porous.

Having thus described my invention, I claim—

1. In a battery, a carbon electrode provided with a circumferential outstanding flange to rest upon the edge of the neck of a battery-jar, having said flange and the adjoining portion of its body for a short distance downward solid, and the remaining portion of its body rendered exceedingly porous by intersecting or communicating foramina extending through it in various directions, substantially as specified.

2. In a battery, an integral carbon electrode open at bottom and closed at top, having at its upper end a circumferential integral flange, its flange and a short adjacent portion of its body being solid, while the remainder of its body is exceedingly porous, provided with a recessed upstanding perforated boss for the upward insertion of a screen to form part of a binding-post, and having an opening in its top plate for the insertion of the thimble to support the zinc electrode, substantially as specified.

3. In a battery, the combination, with the jar A, of the integral cylindrical hollow carbon B, having the supporting-flange $b$, which, with the adjoining portion of its body, is solid, while the remaining portion $b'$ is exceedingly porous, and provided with the recessed boss E, standing from its top plate, the washer $f$, set in the top of said boss, the screw F, passing upward through threaded perforations in the boss and washer, with its head protected in the recess $e$ of the former, and the nut $f'$, engaging the shank of said screw above the boss and forming a binding-post with said screw and washer, substantially as specified.

4. In a battery, the combination, with the carbon electrode B, open at bottom and closed above, of the porcelain insulating-thimble C, with its shank fitted into an opening $c$ in the top plate of the carbon and its flange $c'$ resting upon said plate, the zinc bar D, passing through said thimble down within the carbon, having a rubber washer or gasket surrounding it near its lower end to prevent contact with the carbon, and having a transverse perforation $d'$ near its upper end for the insertion of the end of a circuit-wire, the binding-screw $d^2$, engaging in a threaded recess in the upper end of said bar, and the rubber washer $d^3$, surrounding said bar between the head of said screw and the thimble C, substantially as specified.

In testimony whereof I affix my signature in presence of two witnesses.

JOHN H. DAVIS.

Witnesses:
C. H. SMITH,
Y. BICKHAM.